(12) United States Patent
McMahon (10) Patent No.: US 6,678,214 B1
(45) Date of Patent: Jan. 13, 2004

(54) VEHICLE SYSTEMS REACTION AND ACCELERATION TIMING DEVICE

(75) Inventor: Randy P. McMahon, Yukon, OK (US)

(73) Assignee: Auto Meter Products, Inc., Sycamore, IL (US)

( * ) Notice: Subject to any disclaimer, the term of this patent is extended or adjusted under 35 U.S.C. 154(b) by 447 days.

(21) Appl. No.: 09/718,769

(22) Filed: Nov. 22, 2000

(51) Int. Cl.[7] .......................... G06F 19/00; G06F 10/00
(52) U.S. Cl. ................. 368/6; 368/9; 368/10; 701/1; 307/10.1
(58) Field of Search .................. 368/10; 340/438, 340/441, 456, 466, 992; 123/398, 401; 307/10.1; 701/1

(56) References Cited

U.S. PATENT DOCUMENTS

| | | | |
|---|---|---|---|
| 3,643,158 A | 2/1972 | Kroner et al. ............... 324/162 |
| 4,456,383 A | 6/1984 | Speckhart et al. ............ 368/9 |
| 4,467,219 A | 8/1984 | Reid ........................ 307/10 R |
| 4,784,099 A | * 11/1988 | Noe et al. .................. 123/398 |
| 4,812,671 A | * 3/1989 | Furrow ...................... 307/10.1 |
| 4,846,467 A | 7/1989 | Rosson ..................... 273/1 GE |
| 5,600,185 A | 2/1997 | Hamma et al. ............. 307/10.1 |
| 5,642,712 A | * 7/1997 | Biondo ...................... 123/398 |
| 5,652,468 A | * 7/1997 | Reid ......................... 307/10.1 |
| 5,675,191 A | * 10/1997 | Hamilton et al. .......... 307/10.1 |
| 5,781,869 A | 7/1998 | Parlett, Jr. et al. ............... 701/1 |
| 6,166,629 A | * 12/2000 | Hamma et al. | |

* cited by examiner

Primary Examiner—David Martin
Assistant Examiner—Jeanne-Marguerite Goodwin
(74) Attorney, Agent, or Firm—Jenkens & Gilchrist (57) ABSTRACT

A timing device utilized for determining overall response of a vehicle to initial starting activities. The vehicle is comprised of an engine, a transbrake, a transbrake button and delay box for engaging and disengaging the transbrake, a drive shaft, a throttle stop mechanism, and an acceleration pedal. The timing device is in an operative relationship with the vehicle and produces electrical signals in response to various events that occur prior to and during a drag race. The timing device calculates an elapsed time between various pairs of the electrical signals produced. The device displays the elapsed times to the driver or user in an alphanumeric format.

48 Claims, 6 Drawing Sheets

VEHICLE SYSTEMS REACTION AND ACCELERATION TIMING DEVICE

FIELD OF THE INVENTION

A method and system are described for the purpose of timing various functions of the vehicle and determining the overall response of a vehicle in non-professional or "sportsman" bracket index drag racing competition. More specifically, the method and system utilize sensors and a microprocessor to calculate and store to memory elapsed times between vehicle functions and with a delay, display these times to the user.

BACKGROUND OF THE INVENTION

In bracket drag racing, where there are numerous drivers who compete in heats comprising two drivers, there are two criteria that a driver must meet to win the race. First, the driver must cross the finish line sooner that the other driver in their heat. Second, the time of the winning driver in each heat is compared with a target time. The driver who wins his heat and comes closest to the target time without going under the target time wins the overall race. For example, in a race with a target time of 8.90 seconds, a driver who reaches the finish line with a time of 8.89 seconds will lose the race to the driver whose time was 8.906 seconds. Therefore, in this type of racing, accurate timing is as critical as winning the race. There is a need for drivers to measure every aspect relevant to the vehicle acceleration functions.

It is common at the beginning of the race for the driver to engage a transbrake, which engages both the reverse and first forward gears of the transmission. By forcing the torque of the engine into both directional gears, the one negates the function of the other and the vehicle is kept still. The transbrake is kept engaged by the driver holding down a release button on the transbrake control panel. To begin the race, a number of lights at the starting line of the race track are illuminated in sequence (amber-green) to signal to the driver the start of the race. When the green signal is indicated, the driver releases the transbrake button, which in turn releases the transbrake. The release of the transbrake causes the engine torque to act on a driveshaft, causing it to turn. The vehicle then begins to accelerate.

As mentioned, it is important that the driver match the target of "index" without going under it. To this end, a device known as a "throttle stop" is commonly used in drag racing to partially close the throttle for a pre-selected time period during the race. It is necessary for the racing vehicle to have sufficient power and speed capacity to complete the race in a time shorter than the index time, so that the vehicle will be competitive under all racing conditions. Consequently, although the vehicle is normally run at wide-open throttle to reach maximum acceleration, the throttle cannot be kept wide open for the entire race without exceeding the "index time" for the race. Thus, the throttle stop is used to partially close the throttle for a brief period that is selected to cause the vehicle to complete the race in a time that is as close as possible to the index time. When the throttle stop is released at the end of the pre-selected time period, the throttle returns to its wide-open position until the driver releases the accelerator pedal at the end of the race, commonly referred to as "throttle lift". Both the beginning and ending times for the throttle-stop period are selected before the race based on anticipated race conditions.

All of this activity normally occurs in races of approximately nine or ten seconds. Due to the compacted time frame of the races, there is a need for accurate timing, and it is important for the driver to know how long various activities take, after the vehicle controls have been prearranged to accomplish the task of winning the race. By being able to accurately time various functions of the vehicle, the driver can better adjust the overall performance of the vehicle.

Typically, other devices are utilized which measure one aspect of the vehicle reaction time. For example, some devices only measure the time between the driver's action that starts the forward motion of the vehicle and attainment of a predetermined forward accelerating movement of the vehicle. Although this information is helpful to the driver, more specific and additional times are needed.

Another existing device collects information relevant to various electrical and mechanical functions of the vehicle. This information is then displayed in a graph-style format either in print or on a personal computer screen. To differentiate the relationships of the various activities measured, the driver or interpreter must chart those relationships in correlation to one another on the graph. This process is time consuming and subject to human computational errors.

It is therefore an object of the present invention to provide a novel and improved timing device which overcomes the above-noted problems in the prior art.

It is a further object of the present invention to provide a timing device to measure elapsed times between a variety of related events in a drag racing vehicle.

It is a further object of the present invention to provide a timing device which displays the elapsed times in a user-friendly format that does not require lengthy computation by the user.

SUMMARY OF THE INVENTION

In the preferred embodiment and in accordance with the above-mentioned objects, a timing device is provided for measuring elapsed times between related events in a drag racing vehicle having an engine, a transbrake, means for engaging and disengaging the transbrake, a driveshaft, a throttle stop mechanism, means for activating and deactivating the throttle stop mechanism, a delay box, and an accelerator pedal. The timing device is comprised of means for sensing electrical signals in response to (1) release of a transbrake button or other means for engaging and disengaging the transbrake and (2) actual release of the transbrake. The timing device further includes a means for measuring the elapsed time between the electrical signals so as to measure the elapsed time between release of the transbrake button and actual release of the transbrake. The elapsed time is displayed in an alphanumeric format, so that it is easy for the user to read and understand.

In the preferred embodiment of the present invention, electrical signals are also sensed when the driveshaft begins to turn, when acceleration of the vehicle reaches a selectable, predetermined value of either 0.5 or 1 g force, upon engagement of the throttle stop mechanism, upon disengagement of the throttle stop mechanism, and when the accelerator pedal of the vehicle is released. These elapsed times are measured between the release of the transbrake and each of the above-listed events. All of this information is available for display twenty seconds after the release of the transbrake, on a display screen in an alphanumeric format.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as described by the appended claims.

DESCRIPTION OF ILLUSTRATIVE EMBODIMENTS

Figure 1:
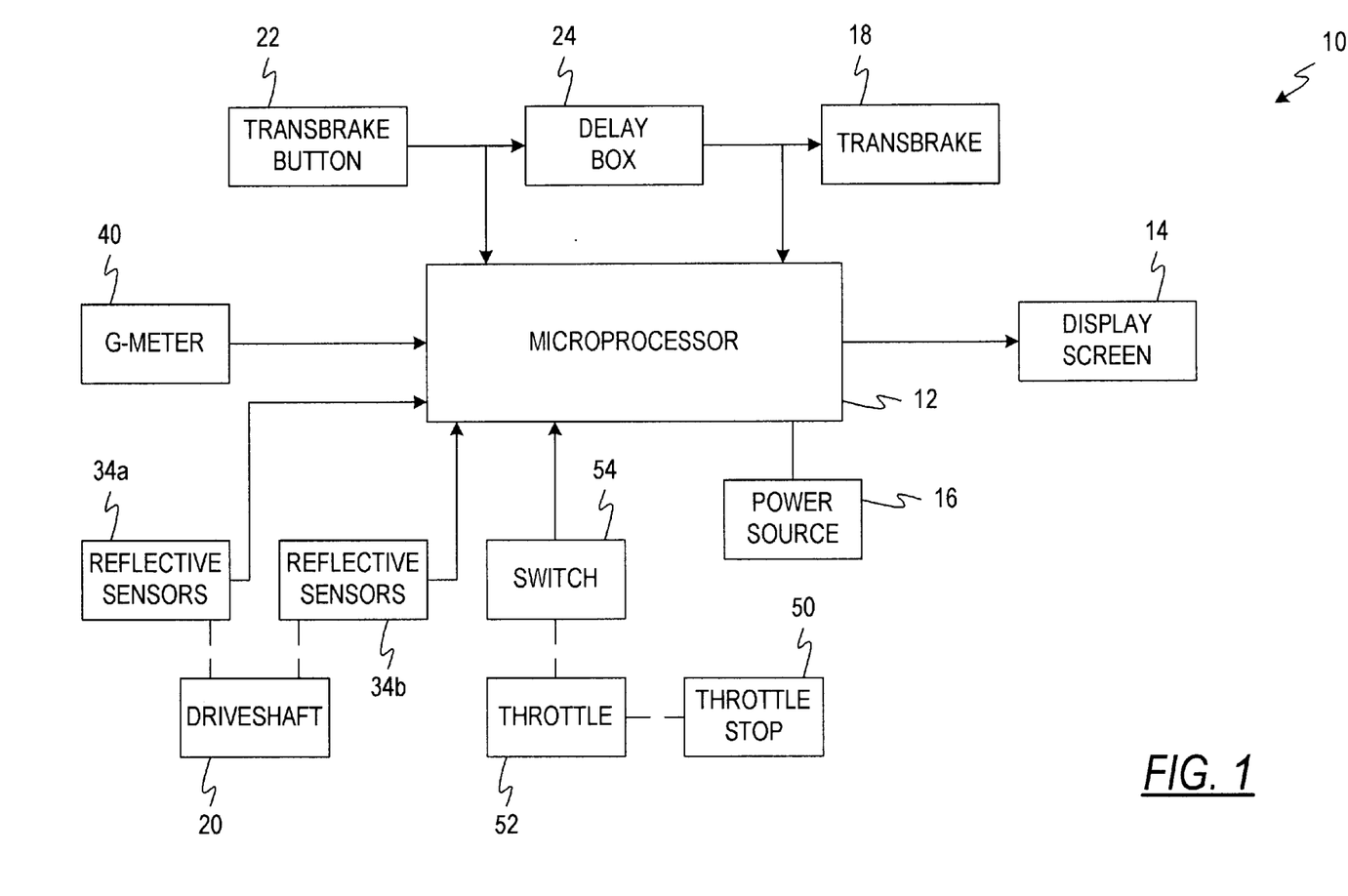
FIG. 1 is a block diagram of a preferred embodiment of a timing device embodying the present invention.

Referring now to FIG. 1, a timing device 10 is shown for measuring a plurality of elapsed times between related events in a drag racing vehicle (not shown). As is known in the art, the vehicle has an engine, a transbrake, a transbrake button or other means for engaging and disengaging the throttle stop mechanism, a delay box, and an acceleration pedal. The timing device 10 includes a microprocessor 12 for measuring the elapsed time between various vehicle activities and a display 14 for displaying the elapsed times to a driver (not shown). The microprocessor 12 receives power from a power source 16 and, when the microprocessor is turned on, an internal memory (not shown) is automatically cleared of all data. Alternatively, the driver may clear the memory of the microprocessor 12 by pressing a "reset button" (not shown). It is also contemplated that the "reset button" could be a switch or other comparable device known in the art. In both embodiments, the memory of the microprocessor 12 is cleared of all data and the microprocessor 12 is prepared to read new input signals.

Figure 2:
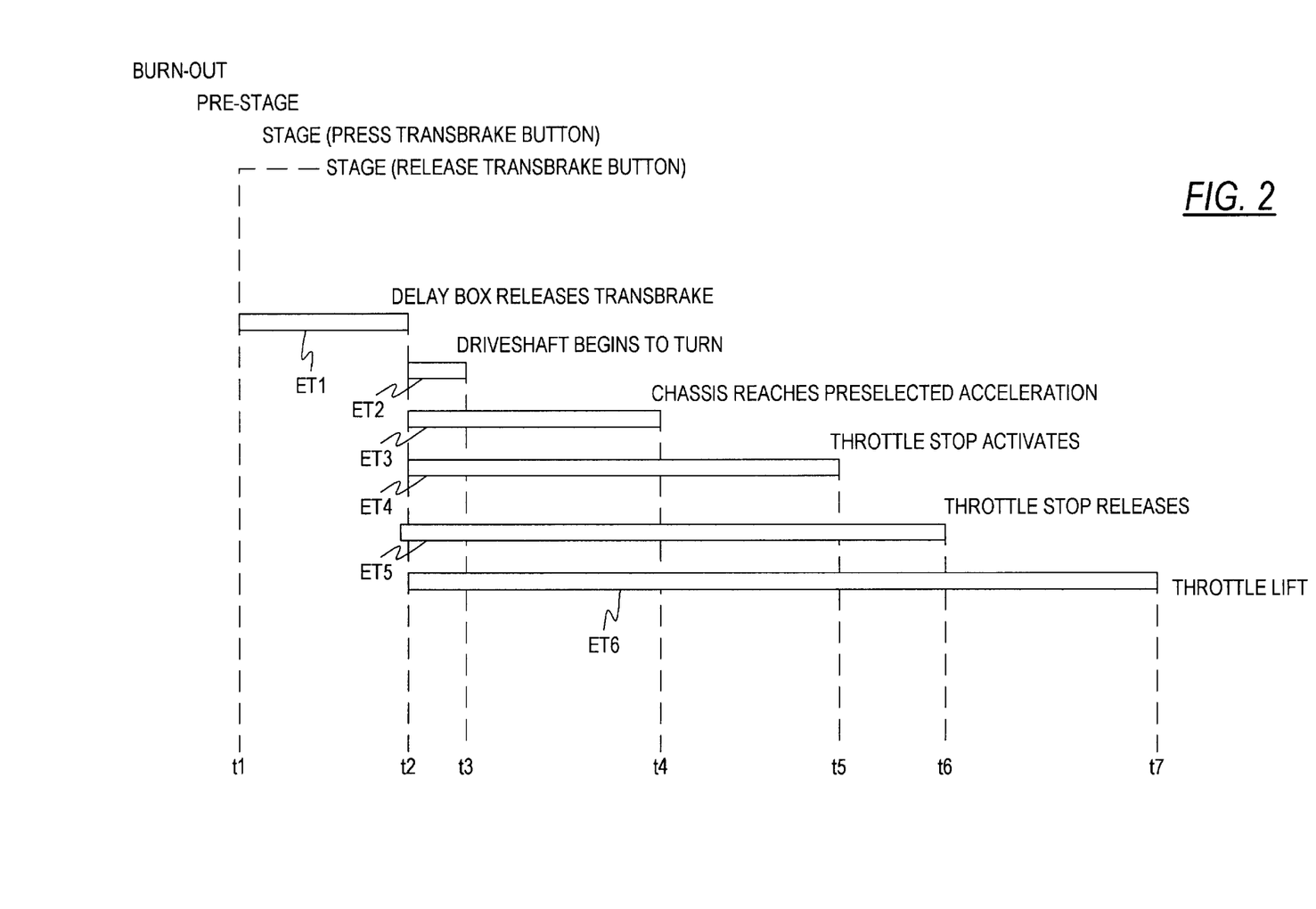
FIG. 2 is a time line indicating the relative timing of the various events detected by the timing device of FIG. 1.

A common time line for a drag race is illustrated in FIG. 2. At the onset of a drag race, the driver of a racing vehicle engages a transbrake 18 which prevents the vehicle driveshaft 20 from turning until the transbrake 18 is released. The driver keeps the transbrake engaged by holding a release button 22 down until he wants to release the transbrake. Alternately, a specific amount of time may be programmed into an on-board microprocessor, commonly referred to as a "delay box" 24 which allows the driver to release the button 22 when the driver first sees an amber light illuminate to signal the commencement of the race. Upon the driver's recognition of the amber light commencement, the release of the transbrake 18 through the delay box 24 is pre-programmed to coincide with the instant the green light illuminates as the start of the race.

When the transbrake button 22 is released, at time t1 in FIG. 2., it sends an electrical signal to a conventional delay box 24 to start the timing of a preset delay interval between the release of the transbrake button 22 and the release of the transbrake 18. The time t2 at which the transbrake is released is commonly referred to as the "launch" of the race. Both the signal that starts the timing of this delay interval and the signal that releases the transbrake are supplied to the microprocessor 12, which detects and stores the times t1 and t2 at which these two events occur. The microprocessor 12 then computes the elapsed time ET1 between the two events so that the driver can verify operation according to the delay box settings. The delay box can be programmed to zero delay, or the transbrake button 22 can be hardwired directly to the transbrake 18, forcing a zero delay.

Figure 4:
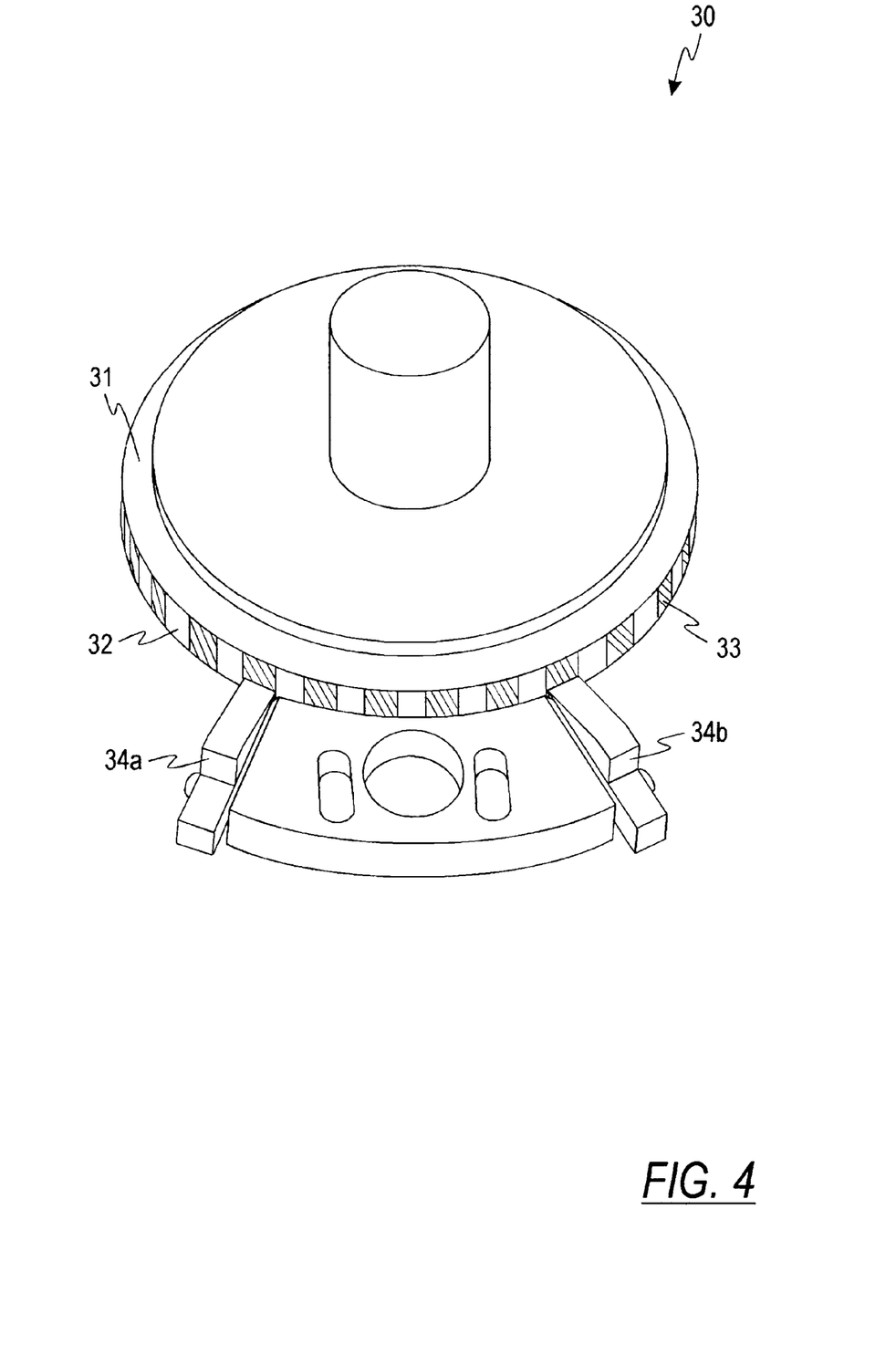
FIG. 4 is a perspective view of an optical sensor used in the timing device of FIGS. 1 and 3a–3c.

To detect the precise time t3 at which the vehicle driveshaft begins to turn, the vehicle driveshaft is equipped with an optical pickup 30 as illustrated in FIG. 4. Specifically, a collar 31 attached to the driveshaft has a series of uniform reflective segments 32 equally spaced around the circumference of the disc and separated by black non-reflective segments 33. A pair of reflective sensors 34a and 34b are mounted in fixed locations a slight distance away from the periphery of the collar 31. A suitable reflective sensor, for example, is Honeywell part No. HOA 1405, which has an infrared emitting diode and a phototransistor encased side-by-side on converging optical axes in a single housing. The phototransistor responds to radiation from the diode only when a reflective object is within its field of view. Thus, when the driveshaft begins to rotate at time t3, reflective segments 32 on the collar 31 will move past the sensors 34a and 34b, causing the phototransistors to produce electrical output pulses. These pulses are used to detect the time t3 at which the driveshaft begins to rotate.

The pulses from the sensors 34a, 34b are supplied to the microprocessor 12, which is programmed to detect and store the time t3 at which the driveshaft begins to rotate. The microprocessor 12 then computes the elapsed time ET2 between the release of the transbrake and the time at which the driveshaft begins to turn, to provide the driver with a measurement of the drive train reaction time. The microprocessor 12 is programmed to require signals from both sensors 34a and 34b to identify the time t3, so as to avoid false triggers that can occur with the use of only one sensor.

A G meter 40 is mounted to the vehicle to sense the acceleration of the vehicle and produce a corresponding electrical output signal, which is supplied to the microprocessor 12. The microprocessor 12 continually compares the actual acceleration value from the G meter with the selected threshold value of 0.5 or 1 G force (where G=32 ft/sec2), and detects and stores the time t4 at which the vehicle acceleration reaches the threshold value. The microprocessor 12 then computes the elapsed time ET3 between the time t2 at which the transbrake is released and the time t3 at which the vehicle acceleration reached the selected acceleration value. Knowing the exact actual value of this elapsed time ET3 helps the driver determine whether any adjustments should be made in the chassis of the vehicle.

As mentioned previously, the throttle stop 50 in a drag racing vehicle typically has at least two time settings that can be adjusted to close and then re-open the throttle 52. The first time settings from the delay box determine the time interval between the release of the transbrake and the time at which the throttle stop is actuated to close the throttle. The throttle then returns to its wide-open position until the driver lifts his foot from the pedal, at which time the throttle closes again.

The microprocessor 12 receives signals indicating the times t5, when the throttle starts to retract from its wide-open position, t6, when the throttle returns to its wide-open position, and t7 when the throttle again starts to retract from its wide-open position due to the removal of the driver's foot from the accelerator pedal near the end of the race. These signals are generated by a signal switch 54 that closes when the throttle reaches its wide-open position, and opens when the throttle starts to retract from its wide-open position. The microprocessor 12 is programmed to start monitoring the condition of this switch after the transbrake has been released; at which time the switch is open. As the switch opens and closes, the microprocessor 12 detects and stores the times t5, t6, and t7 at which these events occur. The microprocessor 12 then determines the elapsed times ET4, ET5, and ET6 between the time t2 at which the transbrake is released and (1) the time t5 at which the throttle began to retract from its wide-open position, (2) the time t6 at which the throttle returned to its wide-open position, and (3) the time t7 at which the throttle again began to retract from its wide-open position due to removal of pressure from the driver's foot from the accelerator pedal near the end of the race. Knowing the exact actual values of these elapsed times ET4–ET6 allows the driver to verify the on and off times of the throttle stop, and to determine whether the "throttle lift" was too early or late.

Figure 3A:
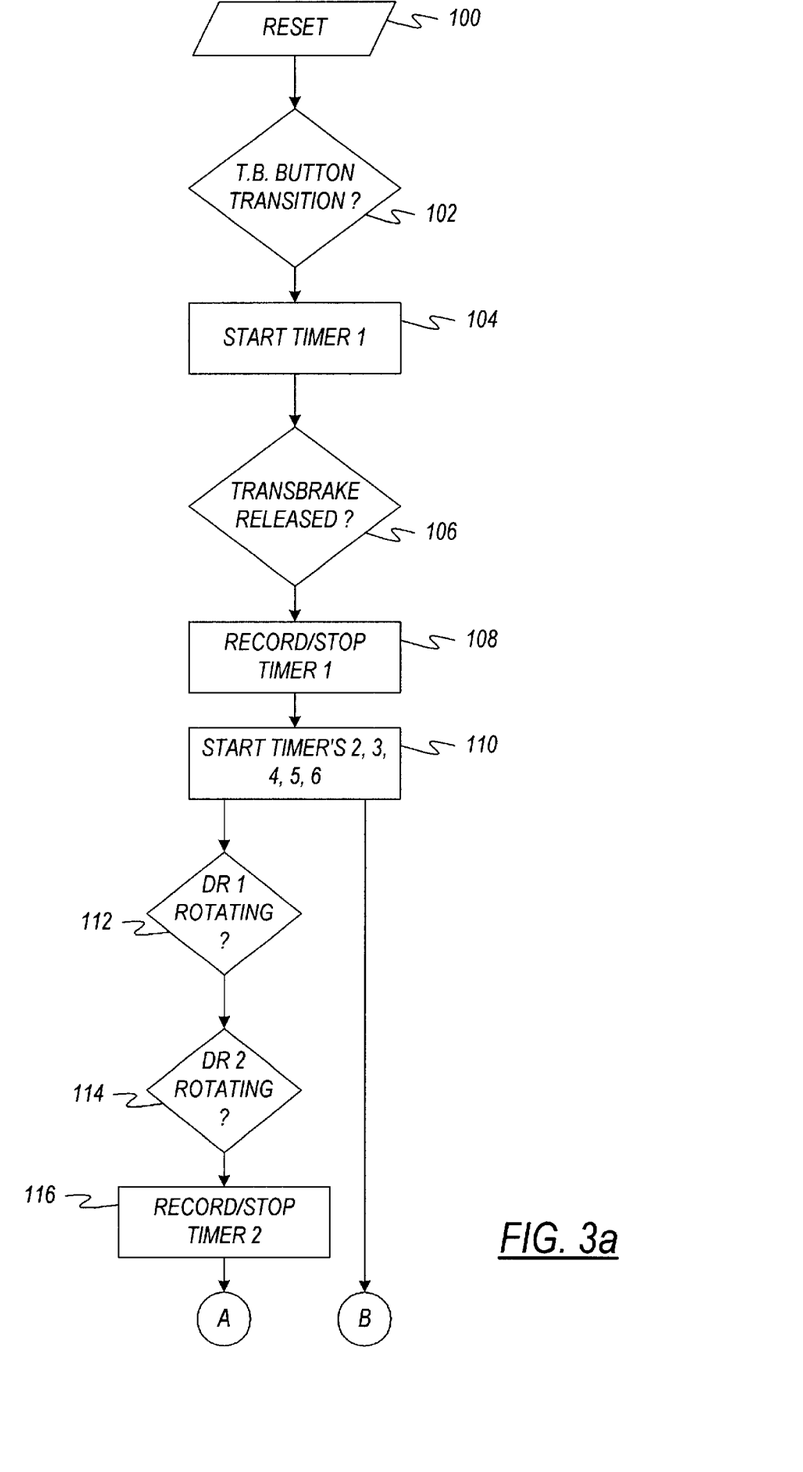
FIGS. 3a through 3c are flow charts of a software program for controlling the microprocessor included in the timing device of FIG. 1.
Figure 3B:
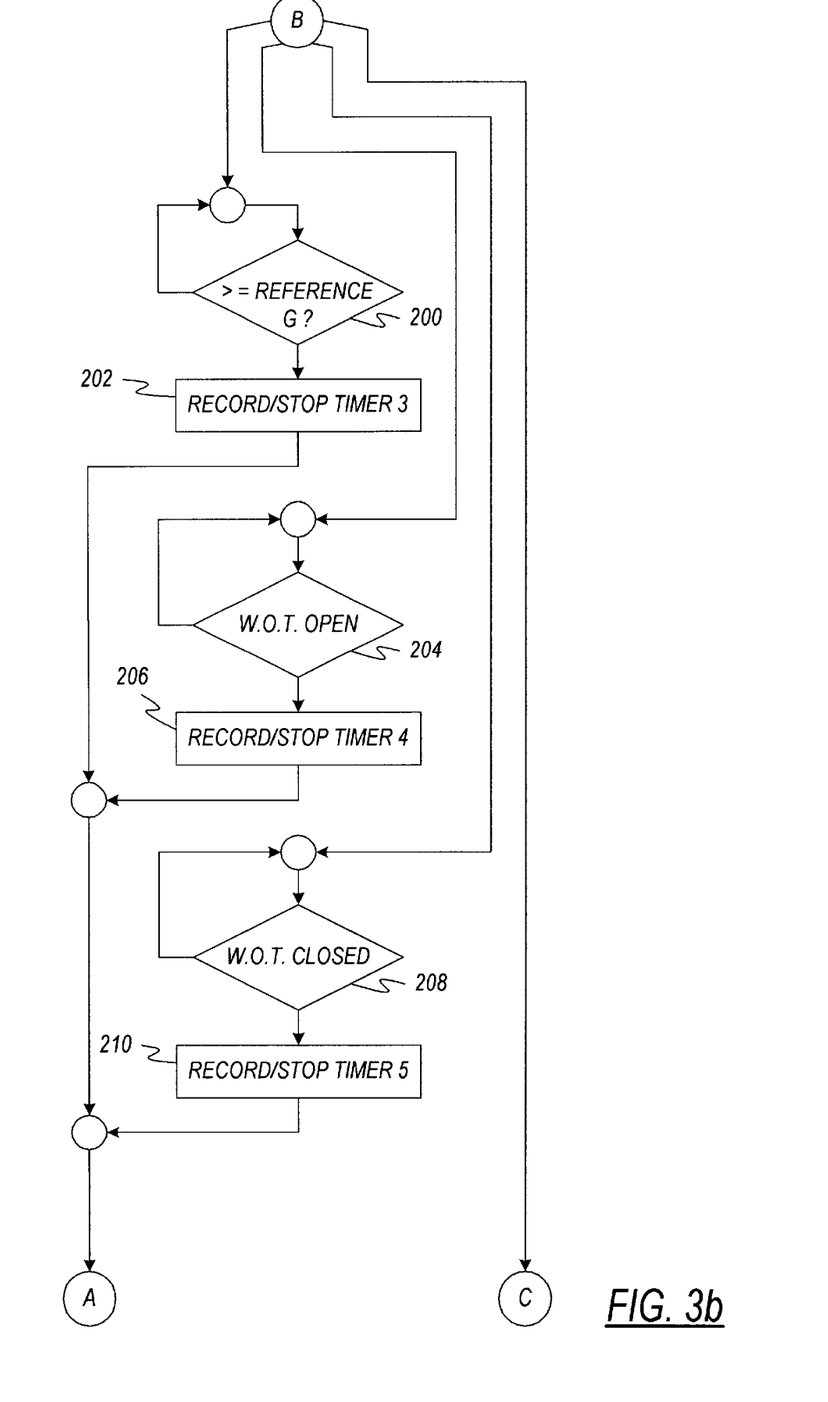
Figure 3C:
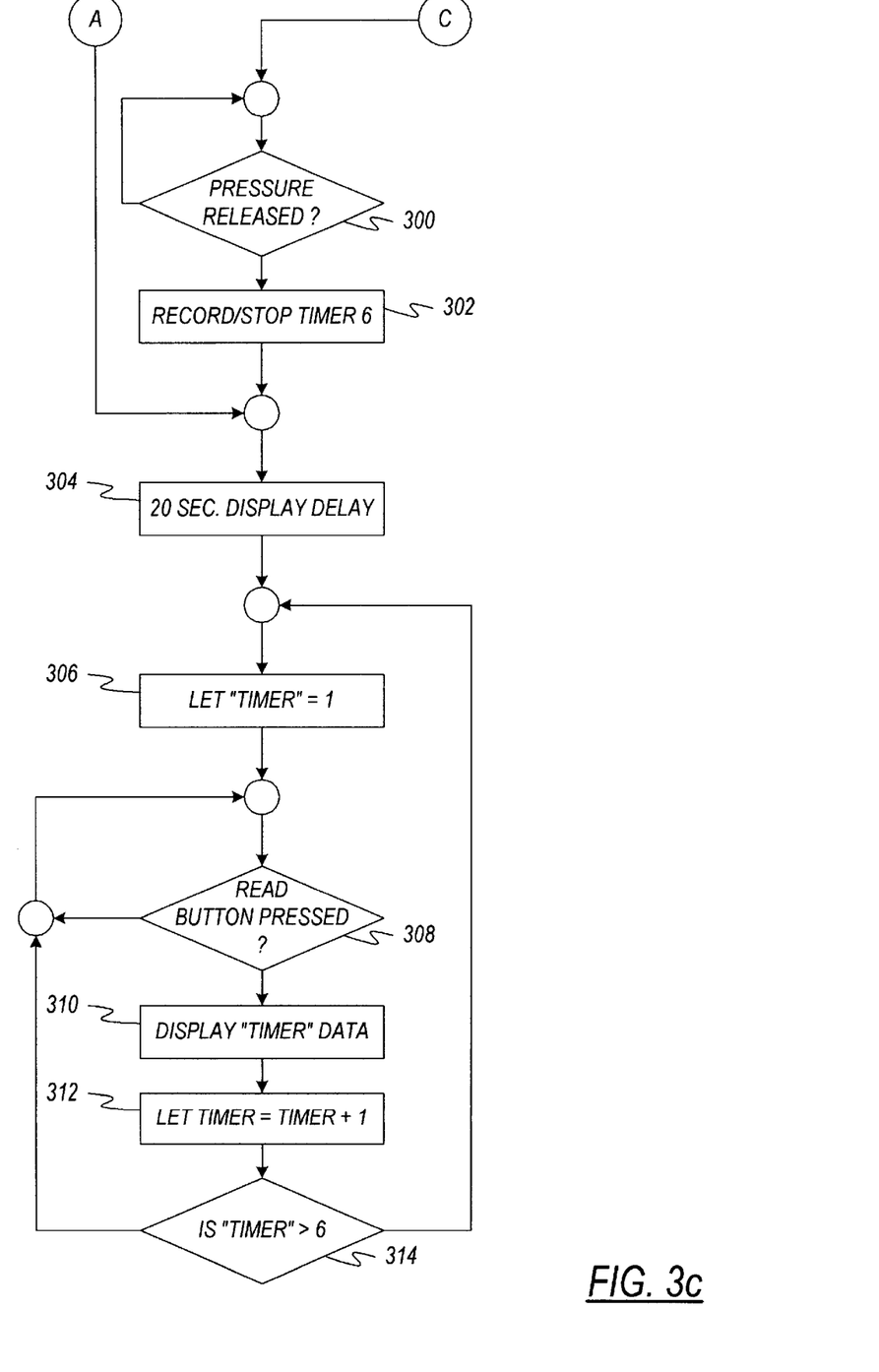

FIG. 3 is a flow chart of a software program for controlling the microprocessor 12 to carry out the operations described above. First, as discussed above, the memory in the microprocessor 12 is reset at step 100 either by the turning on of the power source 20, or the pressing of the reset button (not shown). After the microprocessor 12 memory has been cleared, the program advances to step 102 to look for the electrical signal from the transbrake button that starts the timing of the delay interval in the delay box. If the signal has not yet been received, step 102 yields a negative answer, and the microprocessor 12 waits to receive the signal. When the signal arrives at time t1, step 102 produces a positive response, and the program advances to step 104 to start Timer 1 to measure elapsed time ET1. Timer 1 measures the elapsed time from time t1 until the transbrake is released, which is detected by arrival of a signal from either the delay box or the transbrake button at time t2.

At step 106, the program looks for the signal from the delay box 24 or button. If the signal has not yet been received, a negative response is generated and the microprocessor 12 continues to look for the signal. When the signal arrives at time t2, step 106 produces a positive response, and the program advances to step 108 to stop Timer 1. Elapsed time is now measured and stored in the memory of the microprocessor 12.

Once the signal from the delay box 24 or the transbrake button is received, the program advances to step 110 to start Timer 2, 3, 4, 5, and 6 to measure elapsed time ET2, ET3, ET4, ET5, and ET6, respectively. These elapsed times will be described in greater detail below.

After Timers 2, 3, 4, 5, and 6 have begun, the program advances to steps 112 and 114 to look for the electrical signals from the pair of reflective sensors 34a, 34b. At step 112, the program looks for the signal from the reflective sensor 34a. If signal has not yet been received, the program yields a negative answer and continues to look. When the signal is received, a positive answer is given and the program advances to step 114, where the program looks for a signal from the second reflective sensor 34b. If the program has not yet received the signal, a negative answer is produced, and the program continues to look for the signal. Once the program receives the signal, the program yields a positive response and advances to step 116, which stops Timer 2. Timer 2 measures the elapsed time ET2 between time t2 and the beginning of rotation of the driveshaft, which is detected by arrival of signals from both sensors 34a, 34b at time t3. Elapsed time ET2 is then stored in the memory of the microprocessor 12.

After the start of Timers 2,3,4,5 and 6, the program also advances to step 200, where the program looks for the signal from the G-meter, indicating that a predetermined acceleration has been reached. If signal has not yet been received, a negative answer is generated. When the signal is received, a positive response is generated and the program advances to step 202. At step 202, Timer 3 is stopped. Timer 3 measures the elapsed time ET3 from time t2 until the vehicle reaches the selected acceleration, which is detected by arrival of the signal from the G-meter at time t4. Elapsed time ET3 is also stored in the memory of the microprocessor 12.

The program also advances to step 204 after the start of the Timers 2, 3, 4, 5, and 6 and looks for the signal indicating that the throttle stop in engaged. If the signal has not yet been received, a negative answer is produced, and the program continues to look. Once the signal is received, the program yields a positive answer and the program advances to step 206, which stops Timer 4. Timer 4 measures the elapsed time ET4 from time t2 until the throttle stop is engaged, which is detected by arrival of a signal from the single switch at time t5. The elapsed time ET4 is then stored in the memory of the microprocessor 12.

Concurrently, the program is also working at step 208. At step 208, the program looks for the signal indicating that the throttle stop is disengaged. If this signal has not yet been received, a negative response is generated. When the signal is received, a positive response is generated, and the program advances to step 210 which stops Timer 5. Timer 5 measures the elapsed time ET5 from time t2 until the throttle stop is disengaged at time t6, which is detected by arrival of a signal from the single switch at time t6. At step 210, elapsed time ET5 is stored in the memory of the microprocessor 12. The program is also advancing to step 116. At step 300, the program looks for the signal indicating the closing of the throttle when the driver lifts his foot off the accelerator pedal at the end of the race.

If the signal has not yet been received, the program yields a negative answer and continues to wait for the signal. When the signal is received, a positive answer is produced, and the program advances to step 302. At step 302, the program stops Timer 6, which measures the elapsed time ET6 from time t2 until the closing of the throttle. The closing of the throttle is detected by arrival of a signal from the single switch at time t7. The elapsed time ET6 is then stored in the memory of the microprocessor 12. After Timers 1, 2, 3, 4, 5, and 6 are stopped and the elapsed times ET1, ET2, ET3, ET4, ET5, and ET6 are stored, the program advances to step 304 which causes the microprocessor 12 to delay twenty seconds before displaying any of the elapsed times ET1, ET2, ET3, ET4, ET5, and ET6. After twenty seconds, the program then advances to step 306, where the program sets "timer" equal to 1. The program then advances to step 308, where the program looks for engagement of a "READ" button. If the button had not yet been pressed, a negative response is generated. When the button is pressed, a positive response is generated and the program advances to step 310. At step 310, the program displays the "timer" data on the display screen. After the data has been displayed, the program then advances to step 312, where "timer" is set to equal "timer" plus one. At step 314, the program asks if "timer" is greater than six. If a negative response is generated, the program returns to step 308 and continues the process described above. If a positive response is generated, then the program returns to step 306 and resets the "timer" to one to begin the process again.

In another embodiment, the elapsed times, from Timers 1, 2, 3, 4, 5, and 6, are displayed automatically, and step 308 is eliminated. In this embodiment, in response to a negative answer in step 314, the program proceeds directly to step 310. In another embodiment, all the elapsed times from Timers 1, 2, 3, 4, 5, and 6 are displayed together. Further, in yet another embodiment, the elapsed times are displayed automatically and together.

The advantages of the preferred embodiment of the present invention are numerous. Drivers or other users can have the timing of a variety of different starting functions measured or analyzed. This time data is then presented to them in an easy to read format on a screen or in print. Knowing the elapsed times between these various functions enables drivers to better monitor the vehicle's performance and make adjustments to suit their needs. By knowing the times it takes the vehicle to perform these functions, drivers can adjust their driving and timing to more accurately reach the goal time.

Other embodiments are also contemplated. In one embodiment, the microprocessor 12 can be programmed to only compute specific elapsed times instead of all of the elapsed times. For example, the driver may wish to know the data from the Timer 1, 3, and 4. Under this embodiment, the microprocessor 12 would only transmit those elapsed times chosen by the driver to display screen 46.

In another embodiment, the elapsed times are measured between a selected combination of the various events. The driver or user may wish to see the length of time between the first event, the release of the transbrake button 36, and the last event (the release of pressure on the accelerator pedal 44). In that embodiment, the microprocessor 12 can be programmed such that one of the Timers is started when the electrical signal from the first sensor 22 is received and stopped when the electrical signal from the fifth sensor 34 is received. Alternatively, the driver may wish to see the times between numerous consecutive events. This embodiment allows the drivers or users to customize the timing device 10 to their particular wishes and needs.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A timing device for measuring a plurality of elapsed times between related events in a drag racing vehicle having an engine, a transbrake, means for engaging and disengaging said transbrake, a driveshaft, a throttle stop mechanism, means for engaging and disengaging said throttle stop mechanism, and an acceleration pedal, said timing device comprising:

means for producing electrical signals in response to (1) a release of said means for engaging and disengaging said transbrake and (2) a release of said transbrake;

measuring means in an operative relationship with said electrical signal producing means for measuring a first elapsed time between said electrical signals; and display means in an operative relationship with said measuring means for displaying said first elapsed time in an alphanumeric format.

2. The timing device according to claim 1, wherein said means for producing electrical signals further produces an electrical signal in response to a beginning of a turning of said drive shaft, said measuring means further measures a second elapsed time between said electrical signals produced by said release of said transbrake and said beginning of said turning of said drive shaft, and said display means further displays said second elapsed time in an alphanumeric format.

3. The timing device according to claim 1, further including a means for producing an electrical signal in response to an acceleration of said vehicle reaching a predetermined value, said measuring means further measures a time between said electrical signals produced by said release of said transbrake and said vehicle acceleration reaching said predetermined value, and said display means further displays the time between said electrical signals produced by said release of said transbrake and said vehicle acceleration reaching said predetermined value in said alphanumeric format.

4. The timing device according to claim 3, wherein said predetermined acceleration value is 0.5 or 1 G force.

5. The timing device according to claim 1, wherein said means for producing electrical signals further produces an electrical signal in response to an engagement of said throttle stop mechanism, said measuring means further measures a time between said electrical signals of said release of said transbrake and said engagement of said throttle stop mechanism, and said display means further displays the time between said electrical signals of said release of said transbrake and said engagement of said throttle stop mechanism in said alphanumeric format.

6. The timing device according to claim 1, wherein said means for producing electrical signals further produces an electrical signal in response to a disengagement of said throttle stop mechanism, said measuring means further measures a time between said electrical signals produced by release of said transbrake and said disengagement of said throttle stop mechanism, and said display means further displays the time between said electrical signals produced by release of said transbrake and said disengagement of said throttle stop mechanism in said alphanumeric format.

7. The timing device according to claim 1, wherein said means for producing electrical signals further produces an electrical signal in response to a release of pressure on said accelerator pedal, said measuring means further measures a time between said electrical signals produced by said release of said transbrake and said release of pressure on said accelerator pedal, and said display means further displays the time between said electrical signals produced by said release of said transbrake and said release of pressure on said accelerator pedal in said alphanumeric format.

8. The timing device according to claim 1, wherein said display means further displays said first elapsed time in a graphical format.

9. The timing device according to claim 1, wherein said display means further comprises a delay means for delaying the display for a predetermined time.

10. The timing device according to claim 1, wherein said display means further comprises a means for delaying the display until a read means is activated.

11. The timing device according to claim 1, further comprising an electrical source in an operative relationship with said measuring means, such that when said electrical source is turned on, a memory in said measuring means is erased.

12. The timing device according to claim 1, further comprising a reset means, whereby when said reset means is activated, a memory in said measuring unit is erased.

13. A timing device for measuring at least one elapsed time between related events in a drag racing vehicle having an engine, a transbrake, means for engaging and disengaging said transbrake, a G-meter, a driveshaft, a throttle stop mechanism, and an acceleration pedal, said timing device comprising:

means for producing electrical signals in response to a release of said transbrake button and a plurality of the following:

(a) a release of said means for engaging and disengaging said transbrake:
(b) a beginning of a turning of said drive shaft;
(c) an acceleration of said vehicle reaching a predetermined value;
(d) an engagement of said throttle stop mechanism;
(e) a disengagement of said throttle stop mechanism; and
(f) a release of said accelerator pedal;
measuring means in an operative relationship with said electrical signal producing means for measuring a plurality of elapsed times between said electrical signals produced by release of said transbrake button and a plurality of (a)–(f); and
display means in an operative relationship with said measuring means for displaying said plurality of elapsed times in an alphanumeric format.

14. A timing device according to claim 13, wherein said predetermined acceleration value is 0.5 or 1 G force.

15. A timing device for measuring a plurality of elapsed times between related events in a drag racing vehicle having an engine, a transbrake, means for engaging and disengaging said transbrake, a G-meter, a driveshaft, a throttle stop mechanism, means for engaging and disengaging said throttle stop mechanism, and an acceleration pedal, said timing device comprising:
means for producing electrical signals in response to:
(a) release of said transbrake;
(b) release of said means for engaging and disengaging said transbrake;
(c) beginning of turning of said drive shaft;
(d) an acceleration of said vehicle reaching a predetermined level;
(e) disengagement of said throttle stop mechanism; and
(f) release of pressure on said accelerator pedal;
measuring means in an operative relationship with said electrical signal producing means for measuring a separate elapsed time between (a) and (b), (a) and (c), (a) and (d), (a) and (e), (a) and (f), and (a) and (g); and
display means in operative relationship with said measuring means for displaying said separate elapsed times between (a) and (b), (a) and (c), (a) and (d), (a) and (e), (a) and (f), and (a) and (g) in an alphanumeric format.

16. The timing device according to claim 15, wherein said display means further displays said separate elapsed times in a graphical format.

17. The timing device according to claim 15, wherein said predetermined value is either 0.5 or 1 G force.

18. A method for measuring a plurality of elapsed time between related events in a drag racing vehicle having an engine, a transbrake, a G-meter, means for engaging and disengaging said transbrake, a drive shaft, a throttle stop mechanism, means for engaging and disengaging said throttle stop mechanism, an acceleration pedal, said method comprising the steps of:
producing electrical signals in response to (1) a release of said means for engaging and disengaging said transbrake and (2) a release of said transbrake;
measuring a first elapsed time between said electrical signals of said means for engaging and disengaging said transbrake and said release of said transbrake;
displaying said first elapsed time in an alphanumeric format.

19. The method according to claim 18, further comprising the steps of:
producing an electrical signal in response to a beginning of a turning of said drive shaft;
measuring a second elapsed time between said electrical signals produced by said release of said transbrake and said beginning of said turning of said drive shaft; and
displaying said second elapsed time in an alphanumeric format.

20. The method according to claim 18, further comprising the steps of:
producing an electrical signal in response to acceleration reaching a predetermined value; and
displaying the time between the release of said transbrake and said acceleration reaching a predetermined value in said alphanumeric format.

21. The method according to claim 18, further comprising the steps of:
producing an electrical signal in response to an engagement of said throttle stop mechanism;
measuring a time between said electrical signals of said release of said transbrake and said engagement of said throttle stop mechanism; and
displaying the time between said electrical signals of said release of said transbrake and said engagement of said throttle stop mechanism in said alphanumeric format.

22. The method according to claim 18, further comprising the steps of:
producing an electrical signal in response to a disengagement of said throttle stop mechanism;
measuring a time between said electrical signals produced by said release of said transbrake and said disengagement of said throttle stop mechanism; and
displaying the time between said electrical signals produced by said release of said transbrake and said disengagement of said throttle stop mechanism in said alphanumeric format.

23. The method according to claim 18, further comprising the steps of:
producing an electrical signal in response to a release of pressure on said accelerator pedal;
measuring a time between said electrical signals produced by said release of said transbrake and said release of pressure on said accelerator pedal; and
displaying the time between said electrical signals produced by said release of said transbrake and said release of pressure on said accelerator pedal in said alphanumeric format.

24. The method according to claim 18, further comprising the step of: displaying said first elapsed time in a graphical format.

25. The method according to claim 18, further comprising the step of: delaying said display of said first elapsed time for a predetermined length of time.

26. The method according to claim 18, further comprising the step of: delaying said display of said first elapsed time until a read means is activated.

27. A method for measuring an elapsed time between related events in a drag racing vehicle having a transbrake, means for engaging and disengaging said transbrake, a G-meter, a drive shaft, a throttle stop mechanism, means for engaging and disengaging said throttle stop mechanism, and an acceleration pedal, said method comprising the steps of:
producing an electrical signal in response to a release of said transbrake;
producing an electrical signal in response to a plurality of the following;
(a) a release of said means for engaging and disengaging said transbrake;

(b) a beginning of a turning of said drive shaft;
(c) an acceleration of said vehicle reaching a predetermined value;
(d) an engagement of said throttle stop mechanism;
(e) a disengagement of said throttle stop mechanism; and
(f) a release of pressure on said accelerator pedal;
measuring a plurality of elapsed times between said electrical signals produced by said release of said transbrake and a plurality of (a) through (f); and
displaying said plurality of elapsed times in an alphanumeric format.

28. The method according to claim 27, further comprising a step of: displaying said at least one elapsed time in a graphical format.

29. A method for measuring a plurality of elapsed times between related events in a drag racing vehicle having an engine, a transbrake, means for engaging and disengaging said transbrake, a drive shaft, a throttle stop mechanism, means for engaging and disengaging said throttle stop mechanism, and an acceleration pedal, said method comprising the steps of:
producing electrical signals in response to:
(a) a release of said transbrake;
(b) a release of said means for engaging and disengaging said transbrake;
(c) a beginning of a turning of said drive shaft;
(d) an acceleration of said vehicle reaching a predetermined value;
(e) an engagement of said throttle stop mechanism;
(f) a disengagement of said throttle stop mechanism; and
(g) a release of pressure on said accelerator pedal;
measuring a first elapsed time between (a) and (b);
measuring a second elapsed time between (a) and (c);
measuring a third elapsed time between (a) and (d);
measuring a fourth elapsed time between (a) and (e);
measuring a fifth elapsed time between (a) and (f);
measuring a sixth elapsed time between (a) and (g); and
displaying said first, second, third, fourth, fifth, and sixth elapsed times in an alphanumeric format.

30. The method according to claim 29, further comprising the step of:
displaying said first, second, third, fourth, fifth, and sixth elapsed times in a graphical format.

31. A timing device for measuring a plurality of elapsed times between related events in a drag racing vehicle having an engine, a transbrake, a button for engaging and disengaging said transbrake, a drive shaft, a throttle stop mechanism, a mechanism for engaging and disengaging said throttle stop mechanism, and an acceleration pedal, said timing device comprising:
a first sensor in an operative relationship with said transbrake, said first sensor producing an electrical signal at a time of a disengagement of said transbrake;
a delay box in an operative relationship with said transbrake, said delay box producing an electrical signal at a time of a release of said transbrake;
a microprocessor in operative relationship with said first sensor and said delay box for receiving said electrical signals from said first sensor and said delay box, wherein said microprocessor further computes an elapsed time between said electrical signal of said first sensor and said electrical signal of said delay box; and
a display screen in an operative relationship with said microprocessor for displaying said elapsed time in an alphanumeric format.

32. The timing device according to claim 31, wherein said display screen further displays said first elapsed time in a graphical format.

33. The timing device according to claim 31, further comprising an electrical source, whereby when said electrical source is activated, a memory in said microprocessor is erased.

34. The timing device according to claim 31, further comprising a reset button, whereby when said reset button is activated, a memory in said microprocessor is erased.

35. A timing device for measuring an elapsed time between related events in a drag racing vehicle having an engine, a transbrake, a button for engaging and disengaging said transbrake, a drive shaft, a throttle stop mechanism, a mechanism for engaging and disengaging said throttle stop mechanism, and an acceleration pedal, said timing device comprising:
a first sensor in an operative relationship with said transbrake, said first sensor producing an electrical signal at a time of a disengagement of said transbrake;
a delay box in an operative relationship with said transbrake, said delay box producing an electrical signal at a time of a release of said transbrake;
a second sensor in an operative relationship with said drive shaft, said second sensor producing an electrical signal at a time of a beginning of a turning of said drive shaft;
said microprocessor is in an operative relationship with said second sensor for receiving said electrical signal from said second sensor, wherein said microprocessor computes a elapsed time between said electrical signal of said display box and said electrical signal of said second sensor; and
a display screen in an operative relationship with said microprocessor for displaying said elapsed time in an alphanumeric format.

36. The timing device according to claim 35, wherein said second sensor is comprised of two reflective sensors.

37. A timing device for measuring an elapsed time between related events in a drag racing vehicle having an engine, a transbrake, a button for engaging and disengaging said transbrake, a drive shaft, a throttle stop mechanism, a mechanism for engaging and disengaging said throttle stop mechanism, and an acceleration pedal, said timing device comprising:
a first sensor in an operative relationship with said transbrake, said first sensor producing an electrical signal at a time of a disengagement of said transbrake;
a delay box in an operative relationship with said transbrake, said delay box producing an electrical signal at a time of a release of said transbrake;
a G-meter in an operative relationship with said vehicle producing an acceleration value, a microprocessor in an operative relationship with said G-meter for receiving and comparing said acceleration value with a predetermined value and computing an elapsed time between said electrical signal of said delay box and said acceleration value reaching said predetermined value; and
a display screen in an operative relationship with said microprocessor for displaying said elapsed time in an alphanumeric format.

38. The timing device according to claim 37, wherein said predetermined acceleration value reaches either 0.5 or 1 G force.

39. A timing device for measuring an elapsed time between related events in a drag racing vehicle having an engine, a transbrake, a button for engaging and disengaging said transbrake, a drive shaft, a throttle stop mechanism, a mechanism for engaging and disengaging said throttle stop mechanism, and an acceleration pedal, said timing device comprising:

- a first sensor in an operative relationship with said transbrake, said first sensor producing an electrical signal at a time of a disengagement of said transbrake;
- a delay box in an operative relationship with said transbrake, said delay box producing an electrical signal at a time of a release of said transbrake;
- a second sensor in an operative relationship with said throttle stop mechanism, for producing an electrical signal when said throttle stop mechanism is activated;
- a microprocessor in an operative relationship with said second sensor for receiving said electrical signal from said second sensor, and said microprocessor computes an elapsed time between said electrical signal of said display box and said electrical signal of said third sensor; and
- a display screen in an operative relationship with said microprocessor for displaying said elapsed time in an alphanumeric format.

40. A timing device for measuring an elapsed time between related events in a drag racing vehicle having an engine, a transbrake, a button for engaging and releasing said transbrake, a drive shaft, a throttle stop mechanism, a mechanism for engaging and releasing said throttle stop mechanism, and an acceleration pedal, said timing device comprising:

- a first sensor in an operative relationship with said transbrake, said first sensor producing an electrical signal at a time of a disengagement of said transbrake;
- a delay box in an operative relationship with said transbrake, said delay box producing an electrical signal at a time of a release of said transbrake;
- a second sensor in an operative relationship with said throttle stop mechanism for producing an electrical signal at a time of a disengagement of said throttle stop mechanism;
- a microprocessor in an operative relationship with said second sensor for receiving said electrical signal from said second sensor and computing an elapsed time between said electrical signal of said delay box and said electrical signal of said second sensor; and
- a display screen in an operative relationship with said microprocessor for displaying said elapsed time in said alphanumeric format.

41. A timing device for measuring an elapsed time between related events in a drag racing vehicle having an engine, a transbrake, a button for engaging and releasing said transbrake, a drive shaft, a throttle stop mechanism, a mechanism for engaging and releasing said throttle stop mechanism, and an acceleration pedal, said timing device comprising:

- a first sensor in an operative relationship with said transbrake, said first sensor producing an electrical signal at a time of a disengagement of said transbrake;
- a delay box in an operative relationship with said transbrake, said delay box producing an electrical signal at a time of a release of said transbrake;
- a second sensor for producing an electrical signal at time of release of pressure on said accelerator pedal;
- a microprocessor in an operative relationship with said second sensor for receiving said electrical signal of said second sensor and computing an elapsed time between said time of said delay box and said electrical signal of said second sensor; and
- a display screen in an operative relationship with said microprocessor for displaying said elapsed time in said alphanumeric format.

42. A timing device for measuring at least one elapsed time between related events in a drag racing vehicle having an engine, a transbrake, a button for engaging and disengaging said transbrake, a drive shaft, a throttle stop mechanism, and an acceleration pedal, said timing device comprising:

(a) a delay box in an operative relationship with said transbrake, said delay box producing an electrical signal at a time of a release of said transbrake (b) a first sensor in an operative relationship with said transbrake button, said first sensor producing an electrical signal at a time of release of said transbrake button;

(c) a second sensor in an operative relationship with said driveshaft, said second sensor producing an electrical signal at a time of a beginning of a turning of said drive shaft;

(d) a G-meter in an operative relationship with said vehicle, said G-meter producing an electrical signal at a time when said drive shaft reaches a predetermined acceleration;

(e) a third sensor in an operative relationship with said throttle stop mechanism, for producing an electrical signal at a time when said throttle stop mechanism is activated;

(f) a fourth sensor in an operative relationship with said throttle stop mechanism for sensing a time of a disengagement of said throttle stop mechanism;

(g) a fifth sensor for sensing a time of a release of pressure on said accelerator pedal;

- a microprocessor in an operative relationship with (a) through (g) for receiving at least two of said electrical signals from said (a) through (g) and computing at least one elapsed time between any two of (a) through (g): and
- a display screen in an operative relationship with said microprocessor for displaying said at least one elapsed time in an alphanumeric format.

43. The timing device according to claim 42, wherein said display screen further displays said at least one elapsed time in a graphical format.

44. The timing device according to claim 42, wherein said predetermined acceleration reaches either 0.5 or 1 G force.

45. The timing device according to claim 42, wherein one of said at least two electrical signals is from (a).

46. A timing device for measuring at least one elapsed time between related events in a drag racing vehicle having an engine, a transbrake, a button for engaging and disengaging said transbrake, a drive shaft, a throttle stop mechanism, a mechanism for activating and deactivating said throttle stop mechanism, and an acceleration pedal, said timing device comprising:

(a) a delay box in an operative relationship with said transbrake, said delay box producing an electrical signal at a time of a release of said transbrake;

(b) a first sensor in an operative relationship with said transbrake button, said first sensor producing an electrical signal at a time of a release of said transbrake button;

(c) a second sensor in an operative relationship with said drive-shaft, said second sensor producing an electrical signal at a time of a beginning of a turning of said drive shaft;

(d) a G-meter in an operative relationship with said vehicle, said G-meter producing an electrical signal at a time when said vehicle reaches a predetermined acceleration;

(e) a third sensor in an operative relationship with said throttle stop mechanism, for producing an electrical signal at a time when said throttle stop mechanism is activated;

(f) a fourth sensor in an operative relationship with said throttle stop mechanism for sensing a time of a disengagement of said throttle stop mechanism;

(g) a fifth sensor for sensing a time of a release of pressure on said accelerator pedal;

a microprocessor in an operative relationship with said (a) through (g) for receiving said electrical signal of said (a) through (g) and computing a separate elapsed time between (a) and (b), (a) and (c), (a) and (d), (a) and (e), (a) and (f), and (a) and (g) in an alphanumeric format.

47. The timing device according to claim 46, wherein said display screen further displays said separate elapsed times in a graphical format.

48. The timing device according to claim 46, wherein said predetermined acceleration reaches either 0.5 or 1 G force.

* * * * *